UNITED STATES PATENT OFFICE.

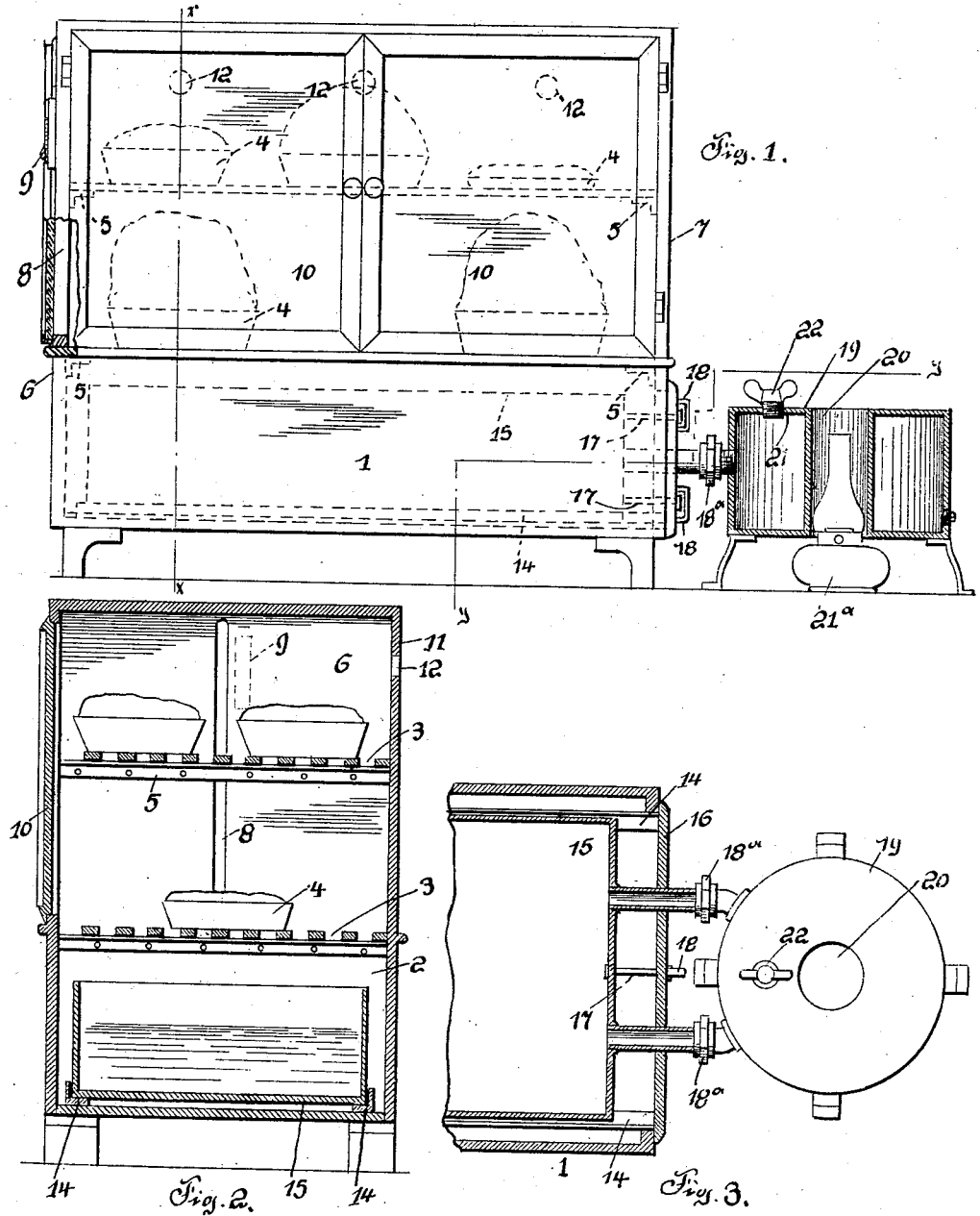

MINTA M. GILL, OF TURTLE CREEK, PENNSYLVANIA.

DOUGH-RAISING DEVICE.

No. 863,982.  Specification of Letters Patent.  Patented Aug. 20, 1907.

Application filed February 21, 1907. Serial No. 358,617.

*To all whom it may concern:*

Be it known that I, MINTA M. GILL, a citizen of the United States of America, residing at Turtle Creek, in the county of Allegheny and State of Pennsylvania, have invented certain new and useful Improvements in Dough-Raising Devices, of which the following is a specification, reference being had therein to the accompanying drawings.

This invention relates to a dough raising device, and the invention has for its object to provide a novel device wherein hot water is employed as a heating medium and a novel casing or cabinet is employed for housing said medium and the bread dough to be raised.

My invention aims to provide a simple and inexpensive dough raising device which will insure good results when pans of bread dough are placed within the device to be raised.

In connection with the device, I employ novel means for heating the same and regulating the ventilation of the device, whereby any desired temperature of heat can be obtained.

The detail construction entering into my invention will be hereinafter more fully described and then specifically pointed out in the appended claims, and referring to the drawing forming part of this specification like numerals of reference designate corresponding parts throughout the several views, in which:—

Figure 1 is a front elevation partly in section of my improved dough raising device, Fig. 2 is a cross sectional view taken on the line $x-x$ of Fig. 1, Fig. 3 is a horizontal sectional view of a portion of the device, taken on the line $y-y$ of Fig. 1.

To put my invention into practice, I provide a suitable cabinet 1 having a lower compartment 2 and horizontally perforated or slotted shelves 3 for supporting pans of bread dough 4. The shelves 3 are detachably supported upon brackets 5 carried by the end walls 6 and 7 of the cabinet.

In order that the condition of the bread dough within the cabinet can be observed at any desired time, I provide the end wall 6 with an opening 8 covered with a suitable transparent material. The end wall 6 is also provided with a thermometer 9, whereby the temperature within the cabinet or casing can be easily determined.

The cabinet 1 is provided with front hinged doors 10, to permit of the pans of bread dough being placed within the cabinet, and the rear wall 11 of said cabinet is provided near its upper edge with ventilating openings 12.

In the lower compartment 2 of the cabinet are mounted guide ways 14 for a hot water receptacle 15 which is attached to the removable end plate 16 of the cabinet by bolts 17 and winged nuts 18. The hot water receptacle 15 connects by two-part pipes $18^a$ with a tank 19 said tank having a central flue 20 whereby it can be placed over a lamp $21^a$ or a burner. The tank 19 is provided with an opening 21 whereby the same can be filled with water, said opening being normally closed by a threaded plug 22. The water contained within the tank 19 is adapted to co-mingle with the water contained in the receptacle 15, and as the water within the tank 19 is heated by the lamp, the water contained within the receptacle 15 is eventually heated sufficiently to maintain the interior of the cabinet in a warm state, such as is necessary to cause a chemical action of the yeast contained within the bread dough and raise the same.

From the novel construction of my improved dough raising device or cabinet, it will be observed that the parts thereof can be readily removed and thoroughly cleansed, thus insuring a perfect sanitary bread raising device. To remove the hot water receptacle, it is only necessary to disconnect the parts of the pipes $18^a$, remove the tank 19 and the lamp $21^a$, and withdraw the end plate 16 and said receptacle.

It is obvious that various changes in the size, proportion and minor details of construction of the cabinet can be resorted to without departing from the scope of the appended claims.

What I claim and desire to secure by Letters Patent, is:—

1. In a dough raiser, a cabinet provided with a removable end wall, shelves within said cabinet, and guides on the bottom of the cabinet, a water-pan connected to said removable end wall and resting on said guides for removal from the cabinet with the removal of the end wall, a water-container outside the cabinet, means for heating water in said water-container, and pipes extending through the removable end wall and establishing communication between said water-container and said water-pan.

2. In a dough raiser, a cabinet provided with a removable end wall, and having a bottom provided with guides, a water-pan received in said guides, bolts connecting said end wall rigidly with said water-pan, a water-container located outside of the cabinet, and pipes extending through the removable end wall and establishing communication between the water-pan and said water-container.

In testimony whereof I affix my signature in the presence of two witnesses.

MINTA M. GILL.

Witnesses:
MAX H. SROLOVITZ,
A. J. TRIGG.